United States Patent Office 3,162,669
Patented Dec. 22, 1964

3,162,669
DIALKYL 4-HYDROCARBONTHIOPHOSPHONOXY-5 - DIHYDROXYALKOXYHEXAHYDROPHTHAL-ATES
David D. Reed, Glenham, and James M. Petersen, Fishkill, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 232,648
4 Claims. (Cl. 260—461)

This invention pertains to novel reaction products of dialkyl hydrocarbonthiophosphonoxyhydroxyhexahydrophthalate and hydroxyepoxyalkanes. More particularly, it pertains to dialkyl 4-hydrocarbonthiophosphonoxy-5-dihydroxyalkoxyhexahydrophthalates and their method of manufacture.

The dialkyl 4 - hydrocarbonthiophosphonoxy - 5 - dihydroxyalkoxyhexahydrophthalates, hereafter known for the sake of brevity as alkoxyhexahydrophthalate derivatives, have been found to be effective as thermal stability additives for fuels, e.g., jet fuels.

The alkoxyhexahydrophthalate derivatives are represented by the formula:

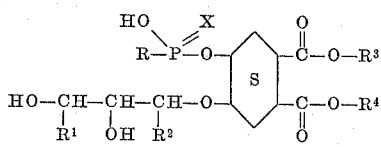

where R is hydrocarbyl (monovalent hydrocarbon derived radical), $R^1$ and $R^2$ are hydrogen or alkyl from 1 to 6 carbons, $R^3$ and $R^4$ are alkyl of from 1 to 20 carbons, and X is sulfur or a mixture of sulfur and oxygen.

Broadly, the novel compounds of the invention are prepared by reacting at elevated temperatures under acid or basic catalyst conditions, a dialkyl 4-hydrocarbonthiophosphonoxy-5-hydroxyhexahydrophthalate and a hydroxyepoxyalkane.

PREPARATION OF THE DIALKYL HYDROCARBONTHIOPHOSPHONOXYHYDROXYHEXAHYDROPHTHALATE REACTANT

The dialkyl hydrocarbonthiophosphonoxyhydroxyhexahydrophthalates and their method of manufacture are described in co-assigned, copending application, Serial No. 232,645 filed Oct. 18, 1962. As described therein, the dialkyl hydrocarbonthiophosphonoxyhydroxyhexahydrophthalates of the formula:

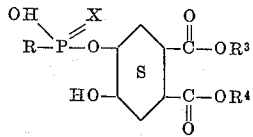

are derived from the reaction of a thiophosphonic acid of the formula:

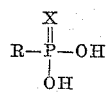

with a dialkyl expoxyhexahydrophthalate of the formula:

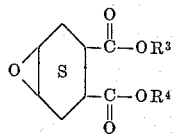

where R, $R^1$, $R^2$, $R^3$, $R^4$ and X are as heretofore defined. The thiophosphonic acid in turn is derived from a hydrocarbon-$P_2S_5$ reaction product.

The reason X in the above formulas is defined as sulfur or a mixture of sulfur and oxygen is because the steam hydrolysis step in the conversion of the hydrocarbon-$P_2S_5$ product to thiophosphonic acid usually results in the replacement of a portion of the sulfur joined to the phosphorus with oxygen.

As pointed out in co-assigned, copending application, Serial No. 232,645, R in the formula for thiophosphonic acid comes from the hydrocarbon portion of the hydrocarbon-$P_2S_5$ reaction product. The hydrocarbons contemplated herein for reaction with a $P_2S_5$ can be aliphatic, cycloaliphatic, aromatic, alkarene, or aralkane hydrocarbons. Lubricating oils derived from cracked hydrocarbon fractions also comprise another desirable class of hydrocarbon materials for reaction with $P_2S_5$. The preferred hydrocarbons for reaction with $P_2S_5$ are olefins. The olefinic hydrocarbons advantageously contain at least 12 carbon atoms although lower molecular weight olefins can be employed. Examples of olefinic polymers contemplated herein are the monoolefinic polymers such as polyisobutene, polybutene and polypropylene and copolymers such as the copolymer of butadiene and isobutylene. Generally, olefin polymers and copolymers having an average molecular weight between 250 and 50,000 are employed. Polymers and copolymers having an average molecular weight between 600 and 5,000 are preferred. A specific preferred monoolefinic polymer is polybutene, having an average molecular weight of between 600 and 5,000.

Examples of the dialkyl thiophosphonoxyhydroxyhexahydrophthalate derivatives contemplated herein are diisodecyl-4-polybutene(940 m.w.)thiophosphonoxy - 5-hydroxyhexahydrophthalate, dipentyl 4-polypropylene(2500 m.w.)thiophosphonoxy - 5 - hydroxyhexahydrophthalate, and hexyldodecyl 4-polyisobutene(1500 m.w.)thiophosphonoxy-5-hydroxyhexahydrophthalate.

THE HYDROXYEPOXYALKANE REACTANT

The hydroxyepoxyalkanes suitable for reaction with the dialkyl hydrocarbonthiophosphonoxyhydroxyhexahydrophthalates have the general formula:

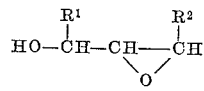

where $R^1$ and $R^2$ are hydrogen or alkyl from 1 to 6 carbons. Examples of the hydroxyepoxyalkanes contemplated herein are 3-hydroxy-1,2-epoxypropane(glycidol), 1-hydroxy-2,3-epoxybutane, and 3-hydroxy-1,2-epoxyhexane.

CATALYST

As heretofore stated, an acid or base catalyst should be present in the reaction for its facilitation. Examples of the acid and base catalyst contemplated herein are the Lewis acids, mineral acids, organic acids, alkali metals and alkali metal alcoholates. Specific examples of the catalyst are $BF_3 \cdot C_2H_5OC_2H_5$ (boron trifluoride etherate), $BF_3$, $HF$, $AlCl_3$, $SnCl_4$, $TiCl_4$, $ZnCl_2$, $H_2SO_4$, $H_3PO_4$, $CCl_3CO_2H$, $CF_3CO_2H$, $Na$, and $C_2H_5OK$.

PREPARATION OF THE ALKOXYHEXAHYDROPHTHALATE DERIVATIVE

Specifically, the alkoxyhexahydrophthalate derivatives are prepared by reacting dialkyl hydrocarbonthiophosphonoxyhydroxyhexahydrophthalate with the hydroxyepoxyalkane in the presence of catalyst at a temperature of between about 25 and 150° C. in a mole ratio of hexahydrophthalate reactant to hydroxyepoxyalkane reactant to catalyst of between about 1:1:0.001 and 1:5:0.1. Although superatmospheric and subatmospheric pressures may be employed, atmospheric pressure is generally utilized.

The alkoxyhexahydrophthalate derivatives can be purified by standard means such as stripping out unreacted reactants at an elevated temperature, e.g., between about 50 and 150° C. and reduced pressures between about 0.01 and 30 mm. Hg utilizing an inert gas such as nitrogen as stripping agent. Those impurities not removed by stripping can be removed by other suitable means such as by clay contacting or contacting with ion exchange resins.

Specific examples of the alkoxyhexahydrophthalate derivatives contemplated herein are diisodecyl 4-polybutene (940 m.w.)thiophosphonoxy-5-(2', 3'-dihydroxypropoxy) hexahydrophthalate; dipentyl 4-polypropylene(2500 m.w.) thiophosphonoxy - 5 - (2', 3' - dihydroxybutoxy) hexahydrophthalate, pentyladecyl 4-polyisobutene(1500 m.w.) thiophosphonoxy - 5 - (1'-methyl-2',3'-dihydroxypropoxy) hexahydrophthalate.

The following example further illustrates the invention by demonstrating the preparation of the alkoxyhexahydrophthalate contemplated herein. The example, however, is not to be considered to be a limitation of the invention.

*Example I*

A naphthenic oil solution containing 0.05 mole of diisodecyl 4-polybutene(940 m.w.)thiophosphonoxy-5-hydroxyhexahydrophthalate of the formula:

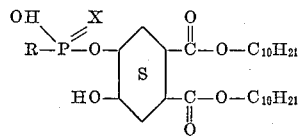

where R is a polybutene radical having an average molecular weight of 940 and X is a mixture of sulfur and oxygen (0.50 wt. percent sulfur based on oil solution) were added in an amount of 147 grams to a 1 liter, 3-neck flask equipped with a stirrer, dropping funnel, gas inlet tube, thermometer and reflux condenser. In addition there was added 3.7 grams (0.05 mole) of 3-hydroxy-1,2-epoxypropane and 0.7 gram (.005 mole) boron trifluoride etherate ($BF_3 \cdot C_2H_5OC_2H_5$). The reaction mixture was heated to 93° C. with stirring and nitrogen blowing for a period of 2 hours. At the end of the reaction period, the unreacted epoxyalkane was stripped out by nitrogen blowing at a temperature of 93° C. under a pressure of 1-2 mm. Hg. The stripped product was identified as an oil solution of diisodecyl 4-polybutene(940 m.w.) thiophosphonoxy - 5 - (2',3'-dihydroxypropoxy)-hexahydrophthalate of the formula:

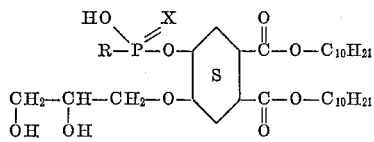

wherein R is a polybutene derived radical (mono-olefinic) having an average molecular weight of 940 and X is a mixture of sulfur and oxygen. The product analyzed as follows:

| Description | Calculated | Found |
|---|---|---|
| Phosphorus, wt. percent | 1.03 | 0.85 |
| Hydroxyl No | 37.2 | 24 |
| Neut. No | 0 | 5.3 |
| Mole ratio, epoxide/phthalate reactants in product | 1.0 | 1.0 |

We claim:
1. An alkoxyhexahydrophthalate derivative of the formula:

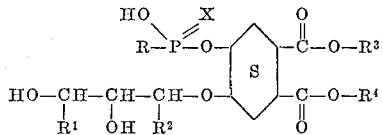

wherein R is hydrocarbyl derived from an aliphatic polyolefin having a molecular weight between 250 and 50,000, $R^1$ and $R^2$ are members selected from the group consisting of hydrogen and alkyl of from 1 to 6 carbons, $R^3$ and $R^4$ are alkyl of from 1 to 20 carbons and X is a chalcogen selected from the group consisting of sulfur and a mixture consisting of a major portion of sulfur and a minor portion of oxygen.

2. An alkoxyhydrocarbonthiophosphonoxy in accordance with claim 1 where R is a polybutene having an average molecular weight of about 940, $R^1$ and $R^2$ are hydrogen and $R^3$ and $R^4$ are isodecyl and X is a mixture consisting of a major portion of sulfur and a minor portion of oxygen.

3. A method of preparing an alkoxyhexahydrophthalate of the formula:

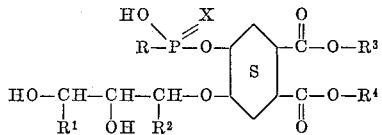

where R is hydrocarbyl derived from an aliphatic polyolefin having a molecular weight between 250 and 50,000, $R^1$ and $R^2$ are members selected from the group consisting of hydrogen and alkyl of from 1 to 6 carbons, $R^3$ and $R^4$ are alkyl of from 1 to 20 carbons and X is a chalcogen selected from the group consisting of sulfur and a mixture consisting of a major portion of sulfur and a minor portion of oxygen, comprising contacting a hexahydrophthalate of the formula:

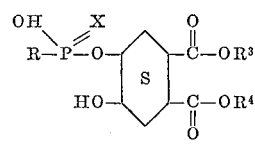

with a hydroxyepoxyalkane of the formula:

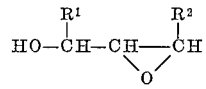

in the presence of a catalyst selected from the group consisting of $BF_3 \cdot C_2H_5OC_2H_5$, $BF_3$, HF, $AlCl_3$, $SnCl_4$, $TiCl_4$, $ZnCl_2$, $H_2SO_4$, $H_3PO_4$, $CCl_3CO_2H$, $CF_3CO_2H$, Na, and $C_2H_5OK$ at a temperature of between about 50 and 150° C. in a mole ratio of hexahydrophthalate reactant to epoxyalkane reactant to catalyst of between about 1:1:0.001 and 1:5:0.1.

4. A method in accordance with claim 3 wherein R is a polybutene derived radical of a molecular weight of about 940, $R^1$ and $R^2$ are hydrogen, $R^3$ and $R^4$ are isodecyl and X is a mixture consisting of a major portion of sulfur and a minor portion of oxygen.

No references cited.